United States Patent
Madany et al.

(10) Patent No.: US 7,152,175 B2
(45) Date of Patent: Dec. 19, 2006

(54) POWER SUPPLY SYSTEM

(75) Inventors: Peter W. Madany, Fremont, CA (US); Hideya Kawahara, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 506 days.

(21) Appl. No.: 10/383,455

(22) Filed: Mar. 6, 2003

(65) Prior Publication Data

US 2004/0177283 A1 Sep. 9, 2004

(51) Int. Cl.
G06F 1/26 (2006.01)
G06F 1/28 (2006.01)
G06F 1/30 (2006.01)
G06F 11/30 (2006.01)

(52) U.S. Cl. .......................... 713/340; 714/14; 714/22

(58) Field of Classification Search ............... 323/143, 323/212, 213, 318, 322; 326/10, 14, 37, 326/48; 713/340; 714/14, 22

See application file for complete search history.

(56) References Cited

U.S. PATENT DOCUMENTS

| | | | | |
|---|---|---|---|---|
| 3,652,866 | A * | 3/1972 | Moakler et al. | 307/80 |
| 5,557,206 | A * | 9/1996 | Won | 324/329 |
| 6,191,500 | B1 * | 2/2001 | Toy | 307/64 |
| 6,483,204 | B1 * | 11/2002 | Hanaki | 307/23 |
| 6,691,248 | B1 * | 2/2004 | Nishijima et al. | 714/14 |
| 6,735,704 | B1 * | 5/2004 | Butka et al. | 713/300 |
| 6,794,849 | B1 * | 9/2004 | Mori et al. | 320/107 |
| 6,906,500 | B1 | 6/2005 | Kernahan | |
| 6,915,438 | B1 | 7/2005 | Boros | |
| 7,036,035 | B1 * | 4/2006 | Allison et al. | 713/340 |

OTHER PUBLICATIONS

American Power Conversion (APC) Corp. "APC Silcon 10kW 208V UPS w/1 BPI", Product Overview and Technical Specifications, [online], Retrieved from the Internet at <URL: http://www.APC.com>, (also attached is "Enterprise and Industrial Power Solutions: Silcon DP300E Series", ® 2000 APC, pp. 1-12).

American Power Conversion (APC) Corp. "Back-UPS 300 w/ L5-15 cord 1 L5-15 Duplex", Product Overview and Technical Specifications, [online], Retrieved from the Internet at <URL: http://www.APC.com>, (also attached is "APC Back-UPS 300, 500, 650: User's Manual").

American Power Conversion (APC) Corp. "Back-UPS 650 Low Leakage UPS", Product Overview and Technical Specifications, [online], Retrieved from the Internet at <URL: http://www.APC.com>, (also attached is "APC Back-UPS 300, 500, 650: User's Manual").

American Power Conversion (APC) Corp. "Matrix-UPS Accessories", ® 1998 APC.

American Power Conversion (APC) Corp. "Server, Network and Telecom Power Solutions: Symmetra Power Array", pp. 1-5.

* cited by examiner

Primary Examiner—Lynne H. Browne
Assistant Examiner—James F. Sugent
(74) Attorney, Agent, or Firm—Meyertons Hood Kivlin Kowert & Goetzel, P.C.; B. Noël Kivlin

(57) ABSTRACT

Disclosed is a system having a power input line. A power supply facility provides the system with a combined set of signals including a power signal and a status signal over the power input line.

Additionally, disclosed is a system having at least two power input lines. Uninterruptible power supply facilities provide the system with combined sets of signals including a power signal and a status signal over the power input lines. Each combined set of signals includes a unique UPS identifier, which can be used to determine whether power sources for power input lines are unique.

8 Claims, 13 Drawing Sheets

POWER SUPPLY SYSTEM

BACKGROUND OF THE INVENTION

1. Field of the Invention

The present invention is related to an improved power supply in systems having two or more power input lines for redundancy.

2. Description of the Related Art

Mission critical systems are often designed to withstand a single point of failure, such as a power failure from a single power source. The term "power source" refers to the source of electrical power (I.e., alternating current ("AC") power or AC power signal), which may be, for example, a power utility such as Pacific Gas & Electric or Southern California Edison. A power failure may be caused by a variety of reasons. For example, a power failure may be caused by bad weather, crumbling infrastructure, or power over load, as well as a variety of other reasons.

Systems, such as mission critical systems, which have two or more power cords for redundancy are often referred to as redundant systems. A power cord connects a redundant system to a device (e.g., a power strip, a power outlet, etc.) through which an AC power signal or AC power signals may be received at the redundant system In particular, the AC power entering certain systems (e.g., a personal computer (PC) or workstation) may be described as an AC power signal over each power input line, while AC power entering certain other systems may be described as AC power signals over each power input line (since these systems use "3-phase" power).

Redundancy refers to use of multiple systems, such that when a first system fails, another system may take over the functionality of the first system. Any computing device, such as a server, mainframe, storage system, router, etc., may be a redundant system or may be part of a redundant system. For example, all powered devices in a server room of a service provider (e.g., a financial institution) may be a redundant system.

In a system in which two or more power cords are used for redundancy, having all of the power cords inadvertently plugged into the same power source can jeopardize the redundancy of the redundant system FIG. 1 illustrates an example of an erroneous power set-up that eliminates the redundancy of computer system 100. Computer system 100 was designed to be a redundant system with power supplies 120 and 130. Power supplies 120 and 130 are within a redundant system and convert an AC power signal to a direct current ("DC") power signal. In this example, an electric company is the power utility 150 that provides electrical power to both power supplies 120 and 130 via a power strip 140. By using the same power utility 150 for both power supplies 120 and 130, a power failure at the electric company that is the power utility 150 will bring down computer system 100. On the other hand, if power supplies 120 and 130 were powered by separate power utilities, then the computer system 100 would continue to be powered by the second power utility in the event of a failure by the first power utility.

Often, redundant systems are powered by an uninterruptible power supply ("UPS"). A UPS includes a battery pack power source and typically receives an AC power signal from a power utility. After a power outage at a redundant system, a UPS enables data to be saved prior to shut down. That is, a UPS provides backup power, via battery, when the electrical power fails or drops to an unacceptable voltage level. There are several types of UPS systems available today including an "online UPS," a "standby UPS," and a "line interactive UPS." An online UPS provides a constant source of electrical power from a battery, while the batteries are being recharged from AC power. A standby UPS, also called an "offline UPS," normally draws current from an AC outlet and switches to battery power within a few milliseconds after detecting a power failure. A line interactive UPS is a hybrid of the online and standby UPS systems.

All UPS systems switch to battery power when the AC power fails. The different types of UPS systems handle the power differently under normal conditions. Standby UPS systems provide limited attenuation, whereas line interactive UPS systems will adjust the voltage and smooth out bad harmonics. Additionally, online UPS systems are constantly regenerating clean power.

Currently available UPS systems receive an AC power signal from a power utility and supply the AC power signal over a power cord and a status signal over a data line (e.g., a serial cable) to a device (e.g., a redundant system) being powered. The status signal may include information about an AC failure and the remaining power capacity (e.g., in minutes) of the UPS. For example, the status signal may indicate an AC power signal failure and that the UPS can continue to provide power for another 53 minutes. The status signal may continue to provide updates on the capacity until the UPS has zero capacity left and stops providing power.

Redundant systems with two power cords should be connected to independent and separate power sources. Since each UPS system supplies an AC power signal to a device, such as a redundant system, each UPS system may be considered to be a power source. For example, connecting each power cord of a redundant system to different UPS systems provides independent power sources to the redundant system (even if both UPS systems receive electrical power from the same power utility). Also, the first power cord may be connected to a UPS system, while the second power cord is plugged into an electrical output powered by a power utility. Alternatively, each power cord can be powered by different power utilities.

FIG. 2 illustrates an example of computer systems 270 and 280 incorrectly connected to two different UPS modules 250 and 260. A UPS module 250 receives an AC power signal at input 251, and UPS module 260 receives an AC power signal at input 261. In this example, the set-up is erroneous because each UPS system sends a power signal and a status signal over separate lines, and the data line of each UPS system has been inadvertently plugged into a device not powered by that UPS system. In particular, a UPS module 250 provides an AC power signal to a power supply 210 over power cord 252 and a status signal to a serial port 240 over data line 253. A UPS module 260 provides an AC power signal to a power supply 220 over power cord 263 and a status signal to a serial port 230 over data line 262. In this situation, the computer systems 270 and 280 think the status signal coming from UPS 250 is associated with UPS 260 and the status signal coming from UPS 260 is associated with UPS 250. The computer systems 270 and 280 do not have the intelligence to know that the data lines were incorrectly plugged into the wrong ports.

FIG. 3 illustrates another possible erroneous set-up. In FIG. 3, computer system 300 receives power from the same power utility 380 by connecting power cords 371 and 372 to power strip 370. Power cord 371 provides an AC power signal to a power supply 310 and power cord 372 provides an AC power signal to power supply 320. UPS 350 receives an AC power signal 351 and provides a status signal over a data line 352 to a port 330. UPS 360 receives an AC power signal 361 and provides a status signal over a data line 362 to a port 340. In this situation, the computer system 300 thinks that the status signal from data line 352 is associated with the AC power signal from power cord 371 and that the status signal from data line 362 is associated with the AC power signal from power cord 372. The computer system 300 does not have the intelligence to know that the status signals are not associated with the power signals coming from power cords 371 and 372, respectively. Furthermore, the computer system 300 thinks it can still withstand a single power failure, but, in reality, computer system 300 cannot withstand any power failures.

The examples described above illustrate only a few ways in which a redundant system can be incorrectly set-up. It is therefore desirable to have the redundant system automatically and reliably determine that its power sources are truly distinct or independent.

SUMMARY OF THE INVENTION

Provided is a system having a power input line. A power supply facility provides the system with a combined set of signals including a power signal and a status signal over the power input line.

Additional implementations provide a system comprising a first power input line, a second power input line, a first data line, a second data line, a first demultiplexor, a second demultiplexor, and a computer system. The first demultiplexor receives first input signals, which include a first power signal and a first status signal, and demultiplexes the first power signal and the first status signal. The second demultiplexor receives second input signals, which include a second power signal and a second status signal, and demultiplexes the second power signal and the second status signal. The computer system is coupled to the first demultiplexor via the first power input line and the first data line and coupled to the second demultiplexor via the second power input line and the second data line. The computer system receives the first power signal over the first power input line and the first status signal over the first data line and receives the second power signal over the second power input line and the second status signal over the second data line. The first status signal includes a first identifier and the second status signal includes a second identifier, and the computer system compares the first identifier with the second identifier to determine whether two different uninterruptible power supply facilities are being used to power the system.

Further implementations provide a redundant system comprising a first power input line, a second power input line, and a computer system that receives a first power signal over the first power input line and a second power signal over the second power input line and compares a first phase of the first power signal with a second phase of the second power signal to determine whether the first power signal and the second power signal are powered by independent power sources.

Yet further implementations provide a method for determining a configuration of a power supply system. A first signal is received. A second signal different from the first signal is received. The first signal and the second signal are compared to determine how the power supply system is configured.

Additional implementations provide a method for determining a configuration of a power supply system in which a message containing an identifier is transmitted through a first source. The message containing the identifier is received through a second source that is different from the first source. It is determined that the first source and the second source are connected to each other based on receiving the message containing the identifier.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several implementations of the present invention. It is understood that other implementations may be utilized and structural and operational changes may be made without departing from the scope of the present invention.

A redundant system may receive an AC power signal or AC power signals (e.g., "3-phase" power) over each power input line, depending on the type of the redundant system. Herein, examples may describe an AC power signal or AC power signals merely for illustration, without limiting the scope of the invention to only one AC power signal or to multiple AC power signals.

Additionally, although examples herein may describe an uninterruptible power supply (UPS) facility, the examples are not intended to limit the scope of the invention to only uninterruptible power supply facilities.

Figure 1:
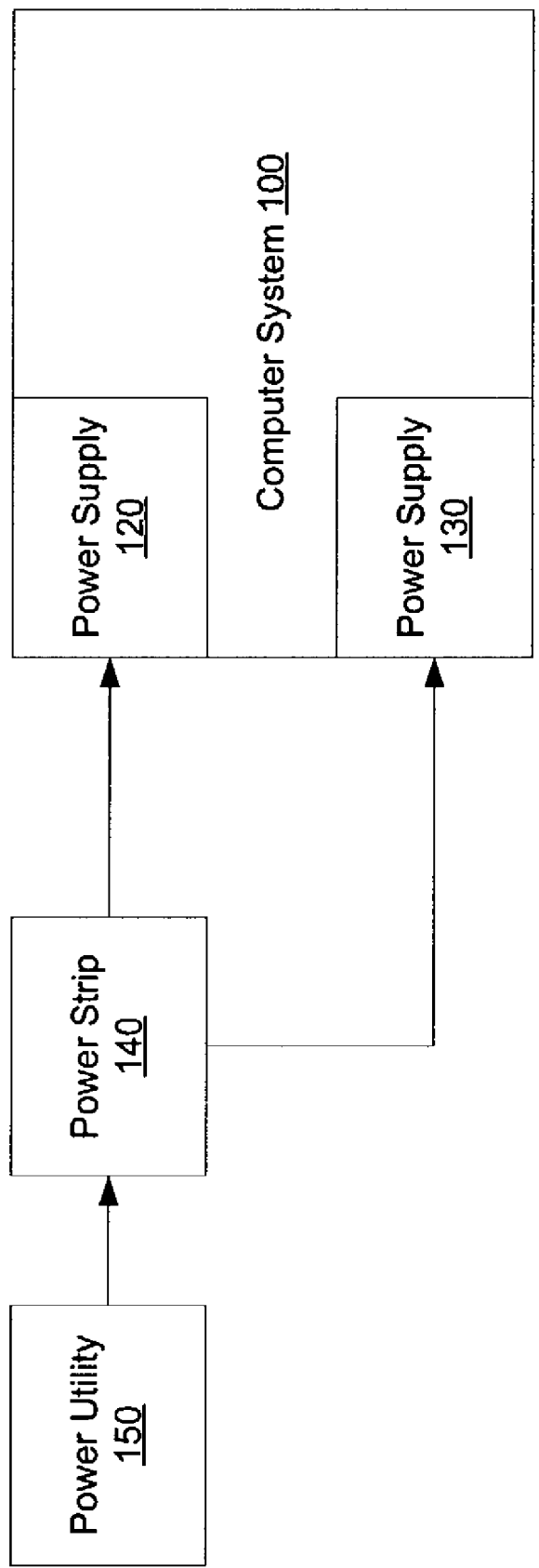
FIG. 1 illustrates a first example of a computer system with an erroneous power set-up.
Figure 2:
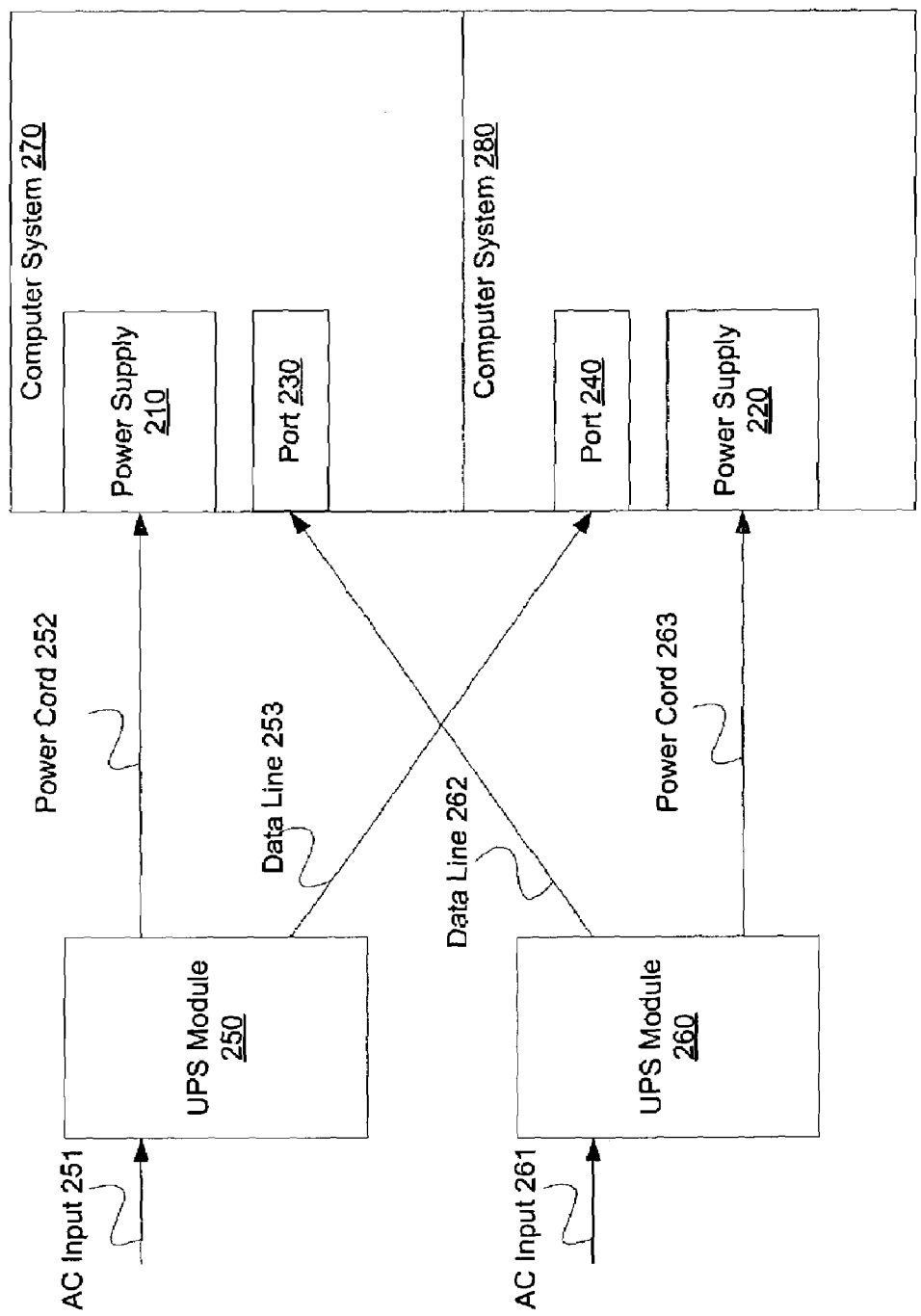
FIG. 2 illustrates a second example of a computer system with an erroneous power set-up.
Figure 3:
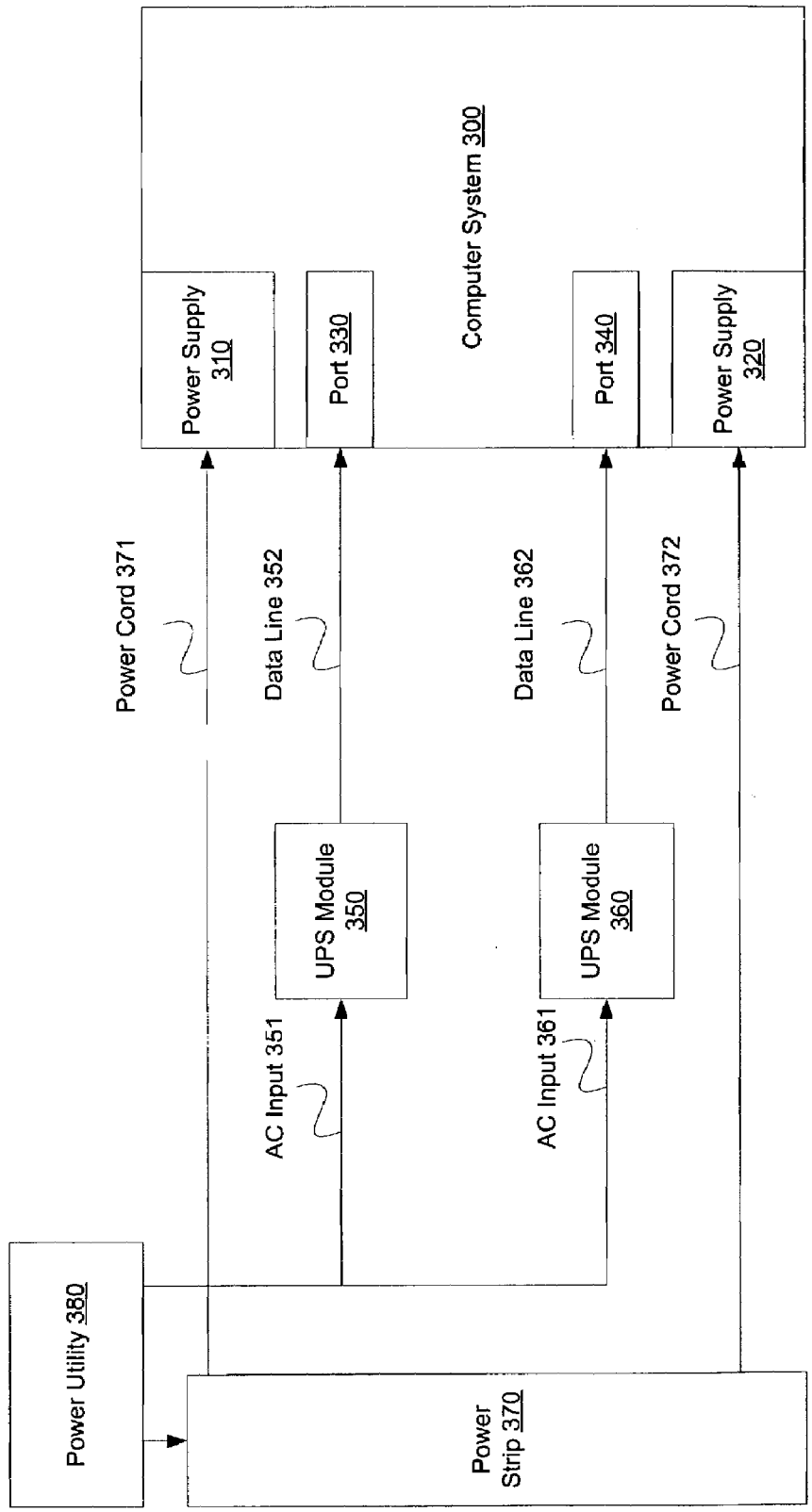
FIG. 3 illustrates a third example of a computer system with an erroneous power set-up.
Figure 4:
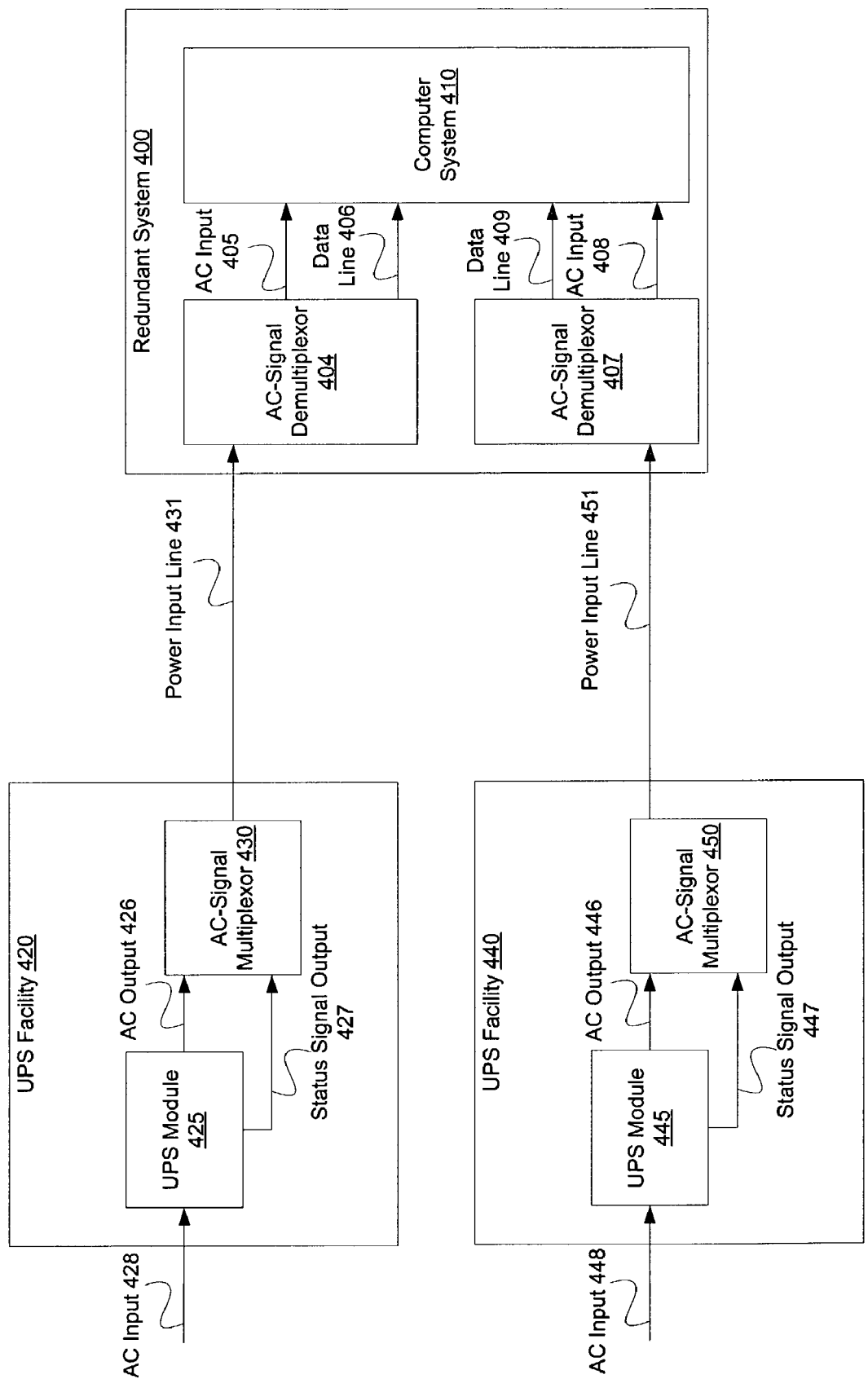
FIG. 4 illustrates a redundant system powered by two independent power sources in accordance with certain implementations of the invention.

FIG. 4 illustrates a redundant system 400 powered by two independent power sources in accordance with certain implementations of the invention. Unlike the conventional power set-up shown in FIG. 2 in which each UPS module provides the AC power signal and the status signal over separate lines to a computer system, each UPS facility 420 and 440 shown in FIG. 4 provides the AC power signal and the status signal over a single power input line, 431 and 451, respectively. In certain implementations, a power input line is a power cord. Rather than using a serial port to communicate between the UPS facility and one or more devices that the UPS facility is powering, a power-line is used as the communication mechanism. In certain implementations, an X-10 device (see www.x10.org for more information) can be used as the communication mechanism.

With implementations of the invention, the cabling requirement between the UPS facility and the device that the UPS facility is powering is reduced to a minimum (i.e., one cable, such as power input line 431 or power input line 451 as shown in FIG. 4). Thus, it is simpler to ensure that the device receiving the status signal is the device being powered by the UPS facility. Additionally, the redundant system may use the status information to determine that the wires between the UPS facility and the redundant system were not improperly connected.

In FIG. 4, the redundant system 400 includes a computer system 410, which may be, for example, any conventional type of computing device, such as a server, mainframe, workstation, desktop computer, laptop, telephony equipment, appliance, redundant array of inexpensive disks ("RAID"), just a bunch of disks ("JBOD"), router, etc. For various implementations of the present invention, redundant system 400 is a server class system. The redundant system 400 includes an AC signal demultiplexor ("demux") 404, which is coupled to power input line 431, and an AC signal demultiplexor 407, which is coupled to power input line 451.

UPS facility 420 receives an AC power signal at input 428. UPS facility 420 includes a UPS module 425 that provides the AC power signal at AC output 426 and a status signal over data line 427 to an AC signal multiplexor ("mux") 430. UPS facility 420 sends both the AC power signal and the status signal over power input line 431.

For alternative implementations, the UPS module 425 may be implemented using various known types of UPS systems that receive an AC power signal and output an AC power signal over a power input line and a status signal over a data line or other communication wire. In certain implementations, the number of UPS facilities may be greater than two.

UPS facility 440 receives an AC power signal at input 448. UPS facility 440 includes a UPS module 445 that provides the AC power signal at AC output 446 and a status signal over data line 447 to an AC signal multiplexor ("mux") 450. UPS facility 440 sends both the AC power signal and the status signal over power input line 451.

In FIG. 4, UPS facility 420 provides the AC power signal over power input line 431, and UPS facility 440 provides the AC power signal over power input line 451. Typically, when redundant system 400 is being powered, an active power source provides most or all of the power, while a back up power source provides minimal or no power to redundant system 400.

In this example, the demultiplexor 404 receives input signals (i.e., the AC power signal and status signal) over power input line 431 that is connected to the active power source. The demultiplexor 404 demultiplexes the input signals, sends the AC power signal over a power input line 405, and sends the status signal over a data line 406 (e.g., a serial cable) to computer system 410. The demultiplexor 407 receives input signals (i.e., the AC power signal and the status signal) over power input line 451 that is connected to the backup power source. The demultiplexor 407 demultiplexes the input signals, sends the AC power signal over a power input line 408, and sends the status signal over a data line 409 (e.g., a serial cable) to computer system 410.

Figure 5:
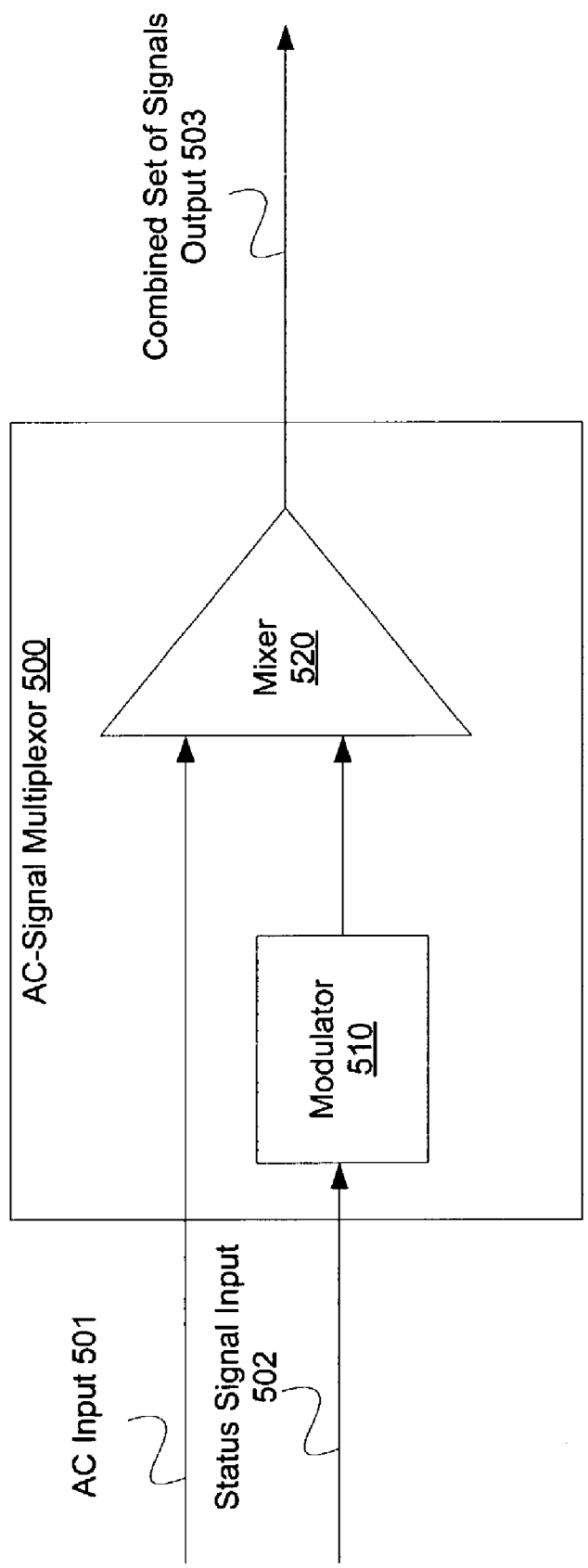
FIG. 5 illustrates an example of a multiplexor in accordance with certain implementations of the invention.
Figure 6:
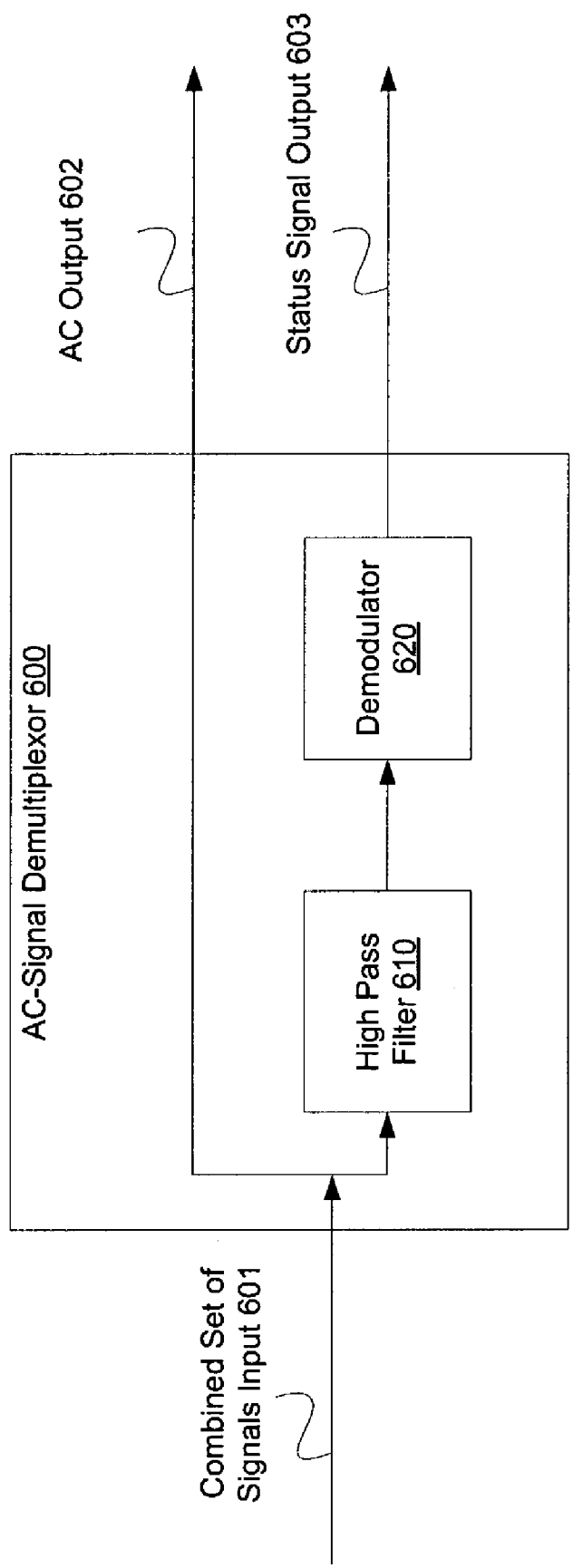
FIG. 6 illustrates an example of a demultiplexor in accordance with certain implementations of the invention.

The complementary multiplexor/demultiplexor configuration shown in FIG. 4 enables the transmission of both the status signal and the power signal over the power input line. FIG. 5 illustrates an example of an AC signal multiplexor that may be used with various implementations of the present invention, and FIG. 6 illustrates an example of an AC signal demultiplexor that may be used with various implementations of the present invention.

A multiplexor is a device that is used to combine multiple parallel signal streams into a single signal stream and is commonly referred to as a "mux." There are different types of multiplexing, one of which may be described as "interleaving" (e.g., Time Division Multiplexing, which is often used for digital signal multiplexing), while other types may be described as "combining" (e.g., Frequency Division Multiplexing, in which the multiplexor combines signals by assigning different frequency bands to one or more signals and adds the signals up after modulation). Since interleaving achieves the effect of combining, examples herein will use the term "combining" rather than interleaving, although implementations of the invention are applicable to all types of multiplexing.

In FIG. 5, since a modulator 510 is used to put the "status signal input" into a desired frequency band which does not conflict with the frequency band of the AC power signal, the type of multiplexing illustrated may be described as "combining" signals. In certain implementations, the AC power signal is at a frequency of 60 hertz.

Multiplexor 500 shown in FIG. 5, receives an AC power signal at input 501 and a status signal at input 502. A modulator 510 modulates the status signal into a high frequency band to avoid interfering with the AC power signal, which is at a low frequency band. A mixer 520 combines the AC power signal and the modulated status signal and outputs the combined set of signals at output 503.

A demultiplexor 600 receives a combined set of signals, including the AC power signal and the status signal at an input 601. The modulated status signal passes through a high-pass filter 610, whose output is then demodulated by demodulator 620. The demultiplexor 600 provides the AC power signal at output 602 and the status signal at output 603.

Figure 7:
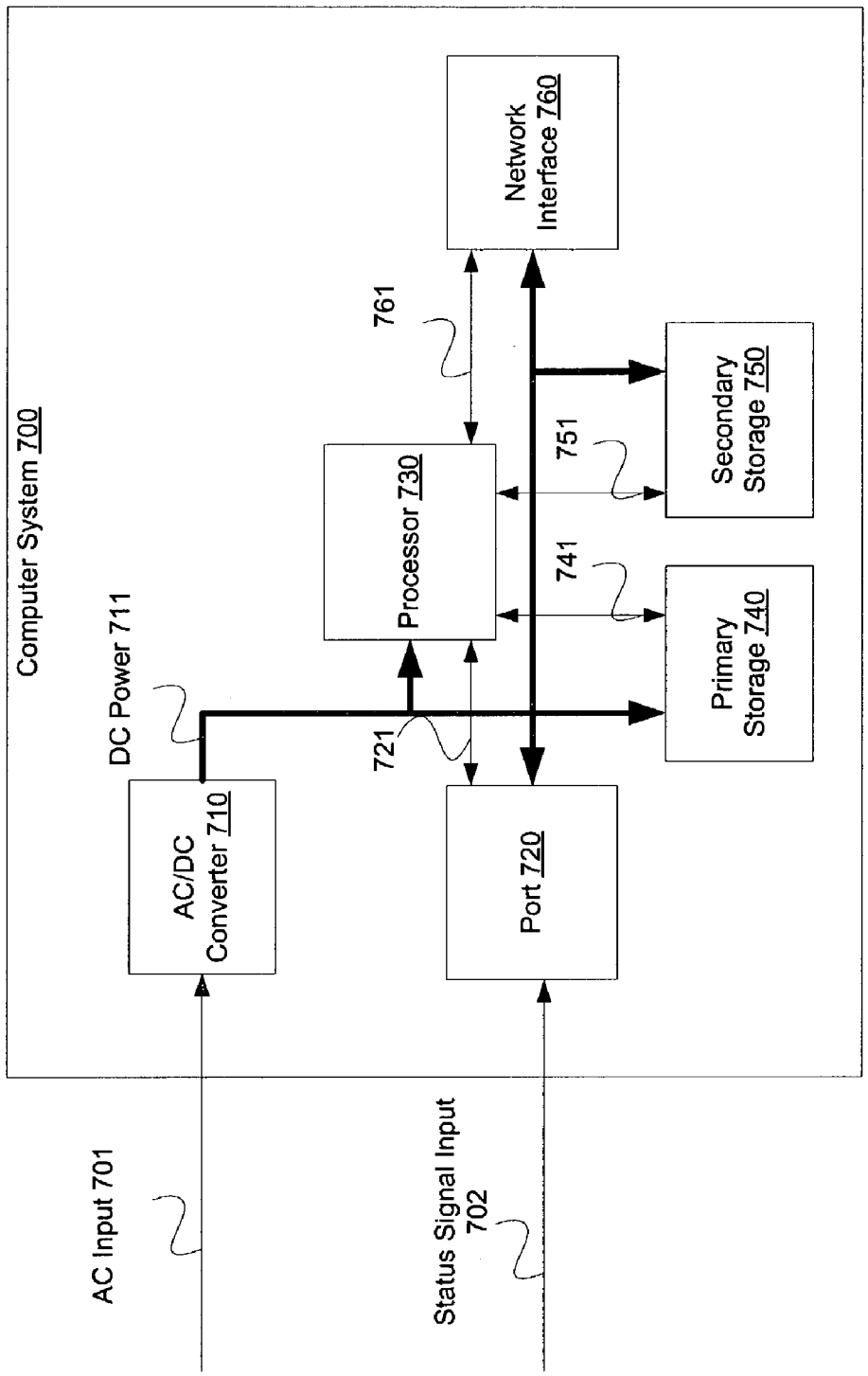
FIG. 7 illustrates an example of computer system in accordance with certain implementations of the invention.

FIG. 7 illustrates an example of a computer system 700 in accordance with certain implementations of the invention. The computer system 700 may include any type of computing, storage, or networking device that processes data. It should also be noted that computer system 700 is an exemplary computer system and alternative implementations of computer systems could have more components than these, a subset of the components shown in FIG. 7, or some combination of all or a subset of the components shown in FIG. 7 and additional components.

Computer system 700 receives an AC power signal at input 701, which is coupled to AC/DC converter 710 (also referred to as a power supply or transformer). Once the AC power signal is converted to a DC power signal or power signals in AC/DC converter 710, the DC power signal or power signals are distributed to the various components within computer system 700 via line or lines 711.

Computer system 700 receives a status signal at input 702, which is coupled to a port 720. A processor 730 is coupled to port 720 via a data line 721, a primary storage 740 via a data line 741, a secondary storage 750 via a data line 751, and a network interface 760 via a data line 761. Primary storage 740 may include memory devices, such as Random Access Memory (RAM) devices. Secondary storage 750 may include one or more hard disk drives, floppy drives, CD-ROM, DVD-ROM, CD-RW, CD-R, DVD-R, Memory Stick®, CompactFlash, SmartMedia, etc.

Primary storage 740 and secondary storage 750 may store instructions to be executed by computer system 700. In addition, instructions to perform the methods described herein (e.g., comparing identifiers or phases) could alternatively be stored on other forms of machine-readable media, including magnetic and optical disks, which are accessible via a disk drive. Further, the instructions can be downloaded into a computing device over a data network.

Figure 8:
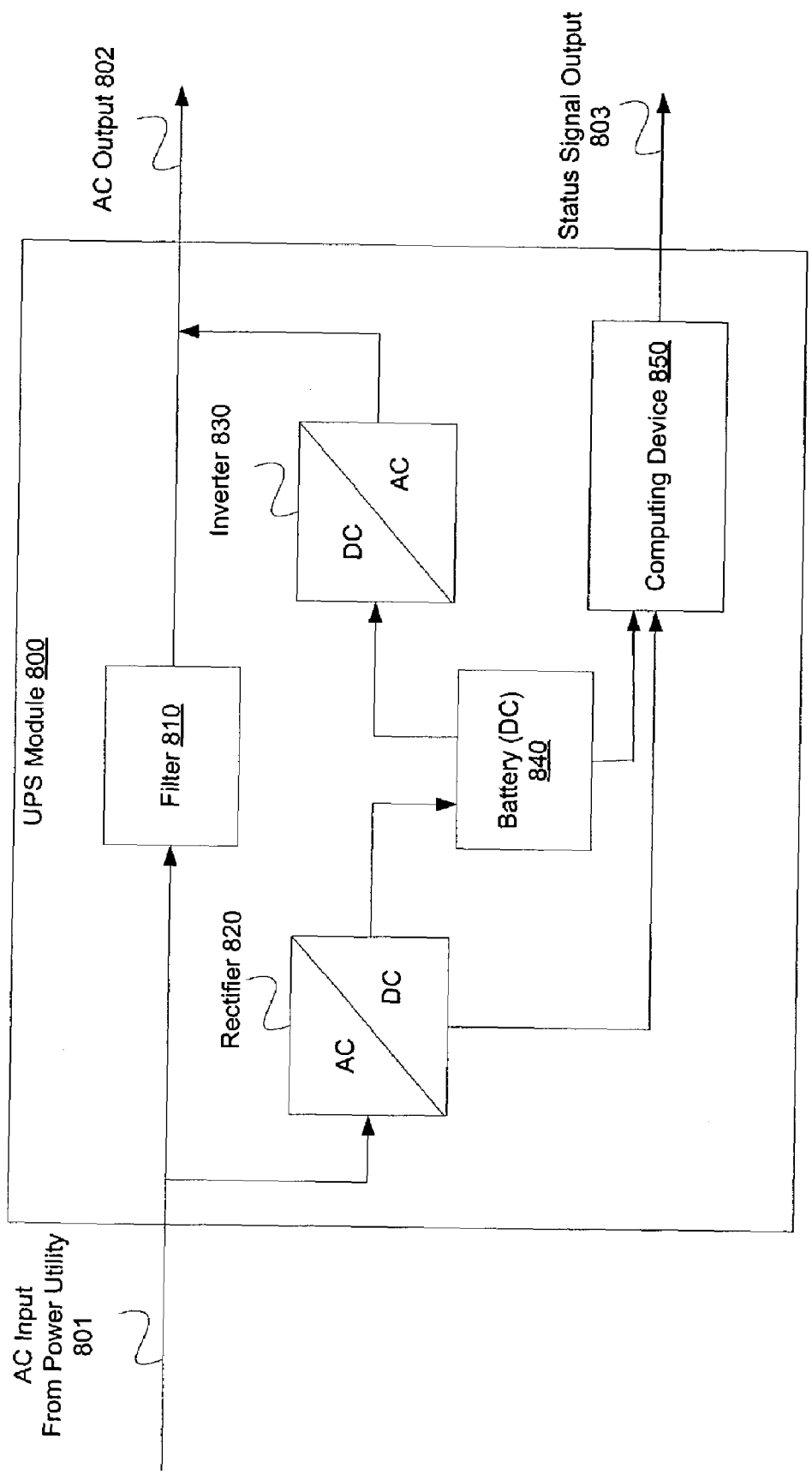
FIG. 8 illustrates an example of a UPS module in accordance with certain implementations of the invention.

FIG. 8 illustrates an example of a UPS module in accordance with certain implementations of the invention. The UPS module 800 in FIG. 8 represents a line interactive UPS. A line interactive UPS is a hybrid of an online UPS, which provides a constant source of electrical power from the battery, and an offline UPS, which normally draws current from an AC outlet and switches to battery relatively quickly after detecting a power failure. Like the offline UPS, the line interactive UPS does not draw constantly from the battery, but switches to the battery when required. Like the online UPS, the line interactive UPS does use the battery when low voltage is encountered. That is, line interactive UPS uses extra power from the battery to make up the difference.

UPS module 800 receives an AC power signal from a power utility at input 801 and provides the AC power signal at output 802 and a status signal at output 803. Under normal conditions, the AC power signal from the power utility flows from input 801 thru filter 810, which filters out bad harmonics, to output 802. When the AC power is low, additional voltage from inverter 830 will adjust the voltage. Furthermore, under normal conditions, rectifier 820 converts the AC power signal to a DC power signal, and battery (DC) 840 is charged by the DC power. During a power failure, UPS module 800 switches to battery (DC) 840, and the DC power signal from battery (DC) 840 is converted to an AC power signal by an inverter 830.

Rectifier 820 is also equipped with an input monitoring feature and sends the current power input level to computing device 850. Battery (DC) 840 is equipped with a battery level monitoring feature and sends the current battery level to computing device 850. Computing device 850 generates the status signal for UPS module 800. The status signal is output at output 803. Computing device 850 may include hardware, software, or a combination of both.

In certain implementations of the invention, the status signal provides identification information about the corresponding UPS module or other power supply. In certain implementations, the UPS module generates the identification information. This type of status signal may be referred to as the "device ID" or "UPS ID" and is typically an identifier ("ID") that is unique to the device or UPS module. Using FIG. 4 for illustrative purposes, the UPS ID for UPS facility 420 may be "5" and the UPS ID for UPS facility 440 may be "10". In certain implementations, the UPS ID would include manufacturer name, model number, and serial number. When this status information is provided to redundant system 400, redundant system 400 compares the UPS ID for each UPS facility 420 and 440, determines that the UPS IDs are unique, and, therefore, knows that its two power input lines are connected to two different UPS facilities. On the other hand, if the redundant system 400 receives the same UPS ID over lines 431 and 451, then redundant system 400 knows that its power input lines are connected to the same UPS facility. In this situation, redundant system 400 knows it is no longer a redundant system. In certain implementations, redundant system 400 sends a message to, for example, a system administrator, indicating that the two UPS IDs are the same. If one or more status signals do not include a unique identifier, the redundant system 400 recognizes that the power input line plugged into a UPS facility whose status signal does not include a unique ID is not using the identification protocol or that the UPS facility is erroneously not sending a unique ID.

Figure 9:
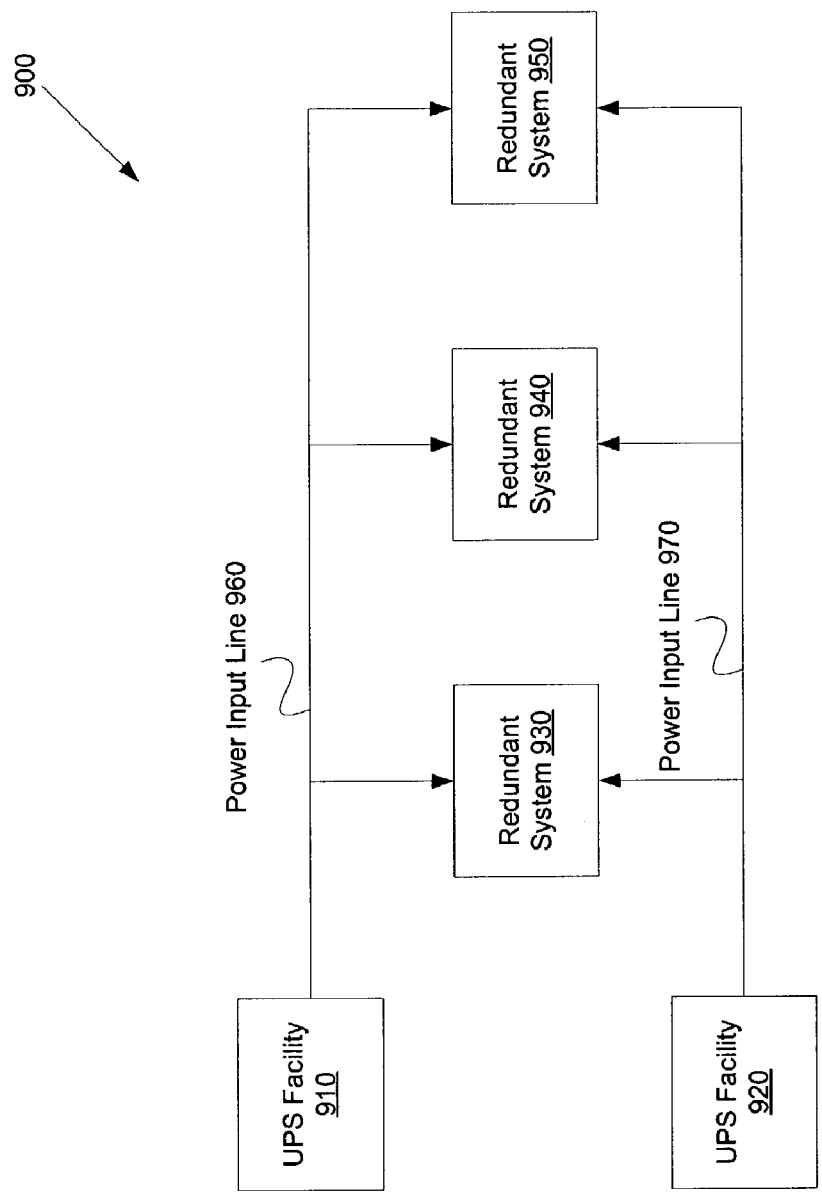
FIG. 9 illustrates multiple redundant systems coupled in parallel and powered by two UPS modules in accordance with certain implementations of the invention.

FIG. 9 illustrates a system 900 having multiple redundant systems coupled in parallel in accordance with certain implementations of the invention. In system 900, UPS facilities 910 and 920 provide power to redundant systems 930, 940, and 950. It should be noted that in alternative implementations, the number of UPS facilities and redundant systems may vary, provided that at least two independent and distinct power sources (i.e., UPS facilities) are used. UPS facilities 910 and 920, respectively, have a configuration similar to the UPS facilities 420 and 440, respectively, shown in FIG. 4. UPS facilities 910 and 920 each include a UPS module coupled to an AC signal multiplexor so that UPS facility 910 outputs both the status signal and the power signal over a power input line 960 and UPS facility 920 outputs both the status signal and the power signal over a power input line 970.

Furthermore, redundant systems 930, 940, and 950 have a configuration similar to redundant system 400 shown in FIG. 4. Redundant systems 930, 940, and 950 each have AC signal demultiplexors so that they can demultiplex the AC power signal and the status signal received. Once demultiplexed, the AC power signal is transmitted to a computer system over a power input line, and the status signal is transmitted over a data line. In this situation, two power input lines 960 and 970 are also doing the work that was previously required by numerous data lines (i.e., two data lines for each computer system or six total data lines).

Figure 10A:
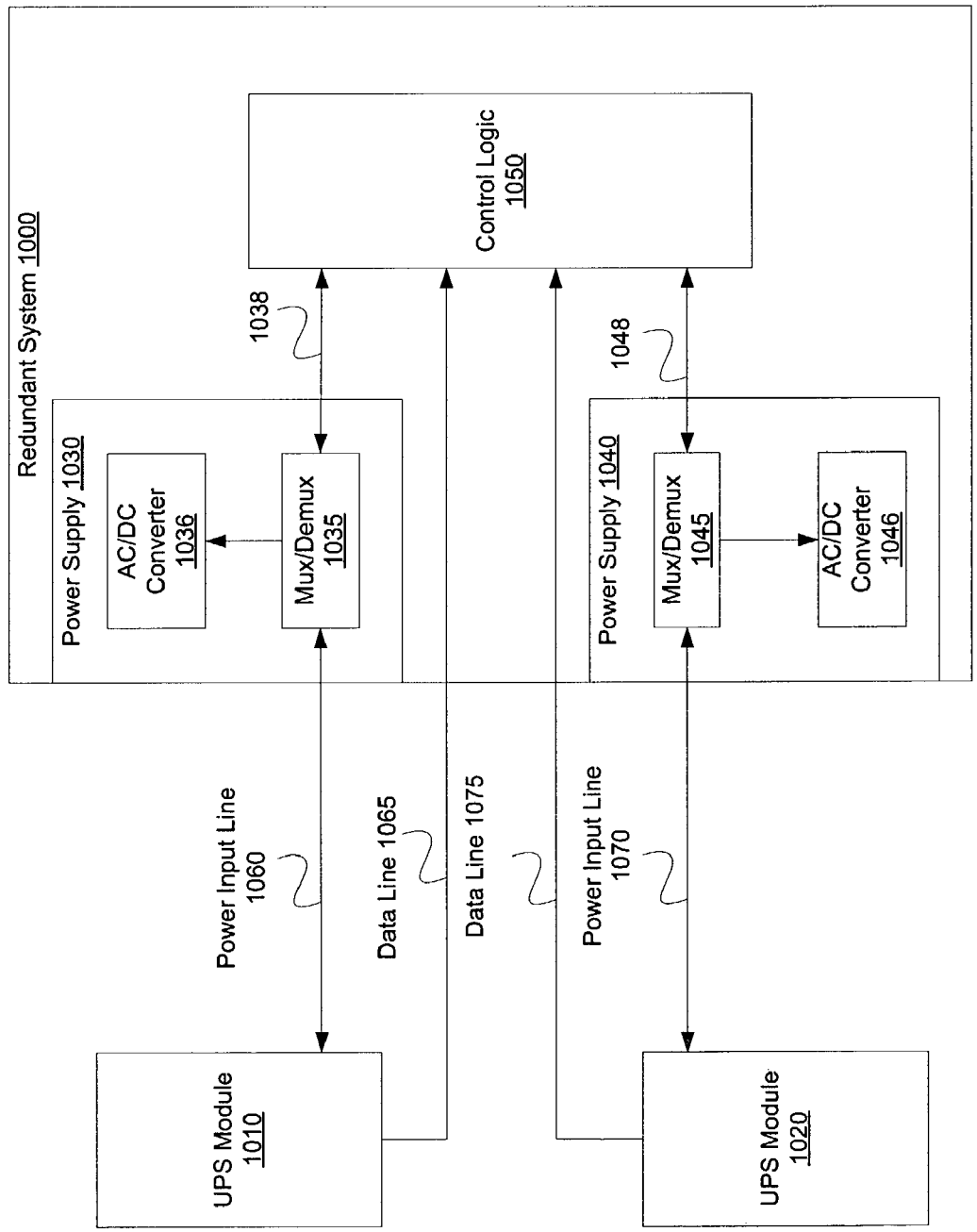
FIGS. 10A and 10B illustrate alternative implementations of a redundant system powered by two independent power sources in accordance with certain implementations of the invention.
Figure 10B:
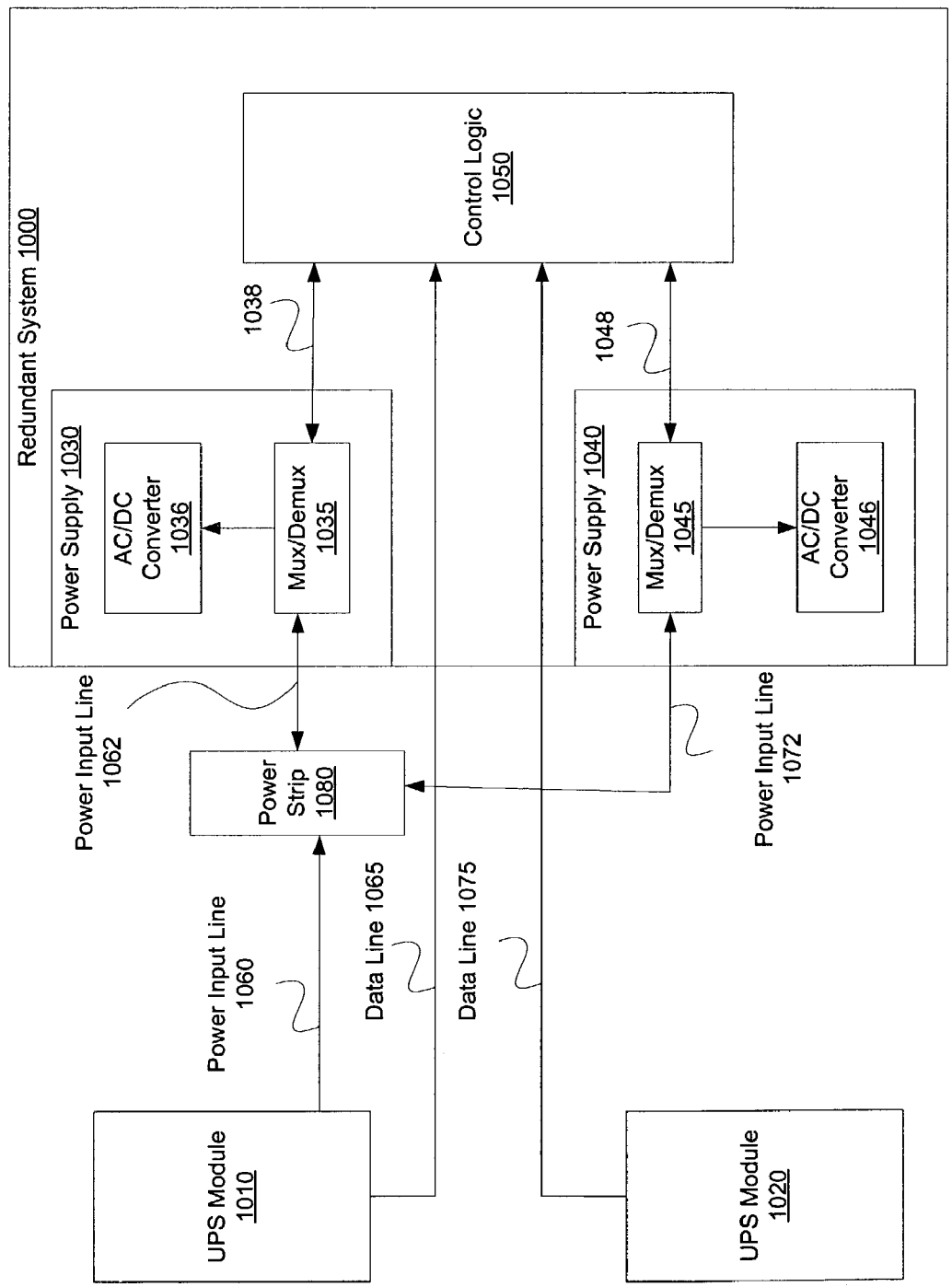

FIGS. 10A and 10B illustrate alternative implementations of a redundant system powered by two independent power sources in accordance with certain implementations of the invention. In FIG. 10A, UPS modules 1010 and 1020 represent conventional UPS modules that output AC power signals on power input lines 1060 and 1070, respectively, and status signals on data lines 1065 and 1075, respectively. Redundant system 1000 includes power supplies 1030 and 1040. Power supply 1030 includes a mux/demux 1035 and an AC/DC converter 1036. A mux/demux 1035 includes a multiplexor for transmitting messages with status information, and a demultiplexor for receiving messages with status information. Similarly, power supply 1040 includes a mux/demux 1045 and an AC/DC converter 1046. Coupled to mux/demux 1030 and mux/demux 1040 is control logic 1050. In certain implementations, the control logic 1050 function is performed by a computer system included in redundant system 1000 (not shown), and for alternative implementations, the control logic 1050 may be performed by hardware, software, or a combination of both, as either part of or external to a computer system.

In FIG. 10A, power supply 1030 is powered by UPS module 1010, and power supply 1040 is powered by UPS module 1020. On the other hand, in FIG. 10B, power supply 1030 and power supply 1040 are powered by UPS module 1010. In particular, in FIG. 10B, UPS module 1010 outputs an AC power signal on power input line 1060 to power strip 1080, which passes the AC power signal to power supply 1030 over power input line 1062 and to power supply 1040 over power input line 1072.

To ensure that redundant system 1000 has its power input lines connected to independent and distinct power sources (e.g., distinct UPS modules), it is desirable to check the power set-up at various times (e.g., every time redundant system 1000 is booted-up (i.e., warm boot), during a power-on self-test (i.e., cold boot), periodically, or every time a power supply detects a voltage surge).

In certain implementations of the invention, the power input lines are tested by transmitting a unique device/power supply ID over the power input lines entering the redundant system. When redundant system 1000 wants to check its power set-up, control logic 1050 sends a message, such as a unique device/power supply ID, through a first source, such as a first power supply. The first power supply passes the message over its power input line, and, if a second source, such as a second power supply, receives that message, the second power supply will then pass the message to control logic 1050. Control logic 1050 makes a determination as to whether the power input lines are correctly set-up based on receiving the message. In particular, if control logic 1050 receives a message with a unique device/power supply ID from the second power supply that the control logic 1050 had sent over a first power supply, then, control logic 1050 recognizes that the first power supply and the second power supply are connected to the same power source.

For example, with reference to FIG. 10B, if power supply 1030 is being tested, control logic 1050 passes a message through power supply 1030 via data line 1038, and the multiplexor of mux/demux 1035 at power supply 1030 multiplexes the message with a completed power signal (i.e., power that has been received via power strip 1080 and is being returned) out over power input line 1062. The message may say something such as, "Power supply 1030 for computer system 1000". Then, power supply 1040 receives the message over power input line 1072, and the demultiplexor of the mux/demux 1045 demultiplexes the message and the AC power signal and passes the message to control logic 1050 over data line 1048. With receipt of the message (e.g., "Power supply 1030 for computer system 1000") that was sent, the control logic 1050 has received information that may be characterized as a negative acknowledgment and knows that it does not have redundant power. In particular, if power supply 1040 receives a message sent through power supply 1030, then the power input lines for power supply 1030 and 1040 are somehow connected. For example, both power input lines may be plugged into the same power strip, junction box, circuit breaker, etc., which then creates a communication path between the power supplies.

On the other hand, with reference to FIG. 10A, if power supply 1030 is being tested, control logic 1050 passes a message through power supply 1030 via data line 1038, and the multiplexor of mux/demux 1035 at power supply 1030 multiplexes the message with a completed power signal (i.e., power that has been received via power strip 1080 and is being returned) out over power input line 1060. The message may say something such as, "Power supply 1030 for computer system 1000". In this case, power supply 1040 would not receive the message because power supply 1030 and power supply 1040 are powered by different power supplies or sources.

Figure 11:
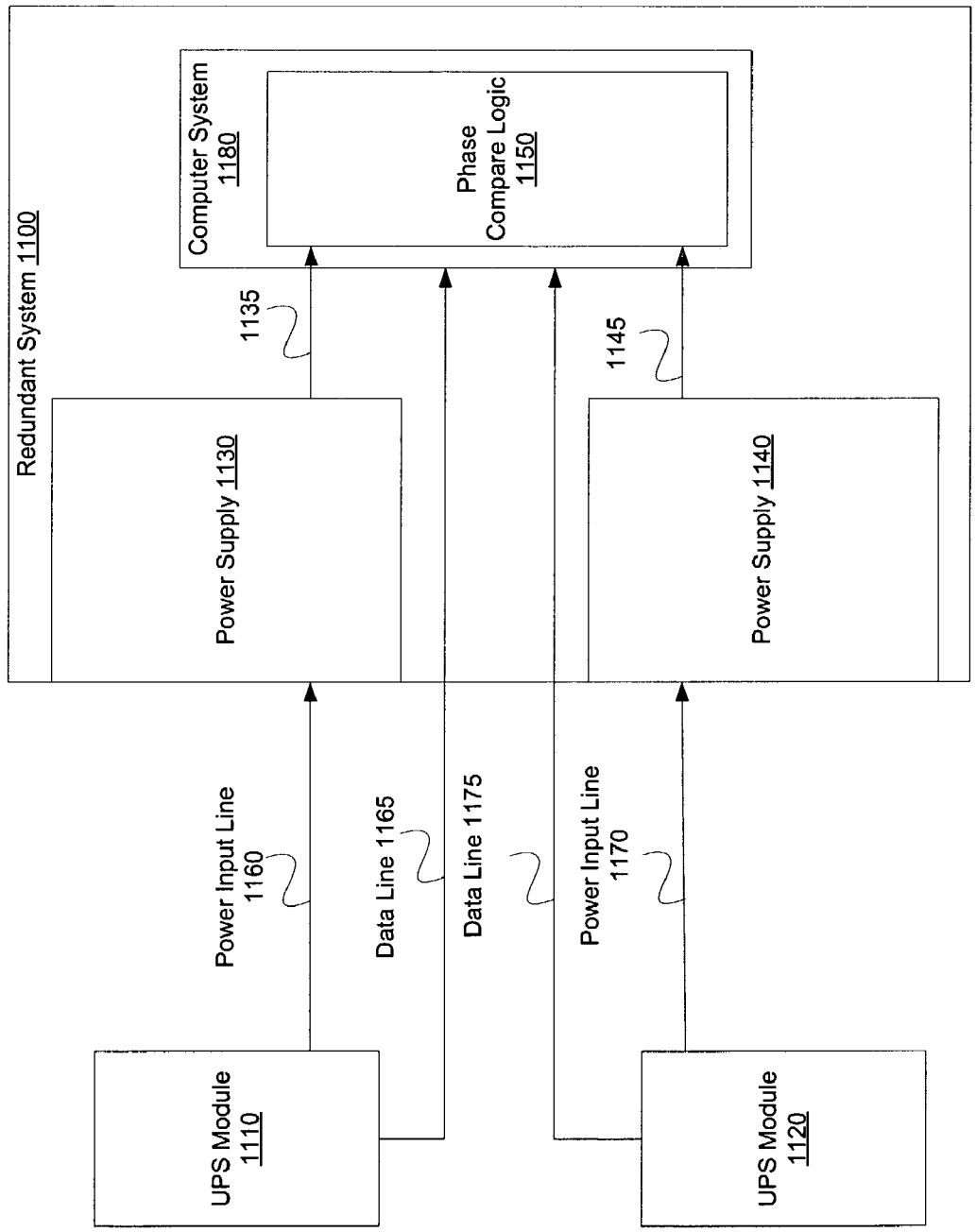
FIG. 11 illustrates a further implementation of a redundant system powered by two independent power sources in accordance with certain implementations of the invention.

FIG. 11 illustrates an alternative implementation of a redundant system 1100 powered by two independent power sources, UPS modules 1110 and 1120, in accordance with certain implementations of the invention. The UPS module 1110 provides an AC power signal over power input line 1160 and a status signal over data line 1165. Similarly, UPS module 1120 provides an AC power signal over power input line 1170 and a status signal over data line 1175.

During normal operation, power supplies 1130 and 1140 convert AC power signals to DC power signals, which are then used to power the various components within computer system 1100. When testing for redundancy, phase information regarding AC power signals received over power input lines 1160 and 1170, respectively, is sent over lines 1135 and 1145, respectively, to phase compare logic 1150. Although phase compare logic 1150 is shown within computer system 1180 in FIG. 11, for alternative implementations, the phase compare logic 1150 may be performed by hardware, software, or a combination of both, as either part of or external to a computer system.

Testing for redundancy may be performed at various times (e.g., every time redundant system 1100 is booted-up (i.e., warm boot), during a power-on self-test (i.e., cold boot), periodically, or every time a power supply detects a voltage surge). Phase compare logic 1150 compares the phases of the AC power signals arriving at each of the power input lines attached to a power supply. If the phases of the two incoming signals are substantially the same (i.e., they are "in-phase"), then it is likely that the same power source (e.g., UPS module) is providing electrical power to both power input lines. In certain implementations, a message is sent to, for example, a system administrator, indicating whether the phases are substantially the same or not. On the other hand, if the phases are not synchronized (i.e., they are "out of phase"), then it is likely that different power sources (e.g., UPS modules) are being used and redundancy is preserved. It should be noted that the accuracy of this testing technique is dependent on the margin of error in measuring the phasing of the incoming AC power signals. It should also be noted that errors may occur if the particular UPS module is designed to be synchronized with AC power signals from a power utility and one power input line of computer system 1100 is plugged into a UPS module and the other power input line is plugged directly into the power utility. For example, in certain implementations, if AC power signals are oscillating at 50 hertz or 60 hertz, and the AC power signals are traveling at 186,000 miles per second, the phases of the two incoming signals are said to be out of phase if the phases are different by 10 microseconds (i.e., a $100^{th}$ of a millisecond). That is, the margin of error, in certain implementations, is 10 microseconds.

The described techniques for improved power supply may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which described implementations are implemented may further be accessible through a transmission medium or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

Figure 12:
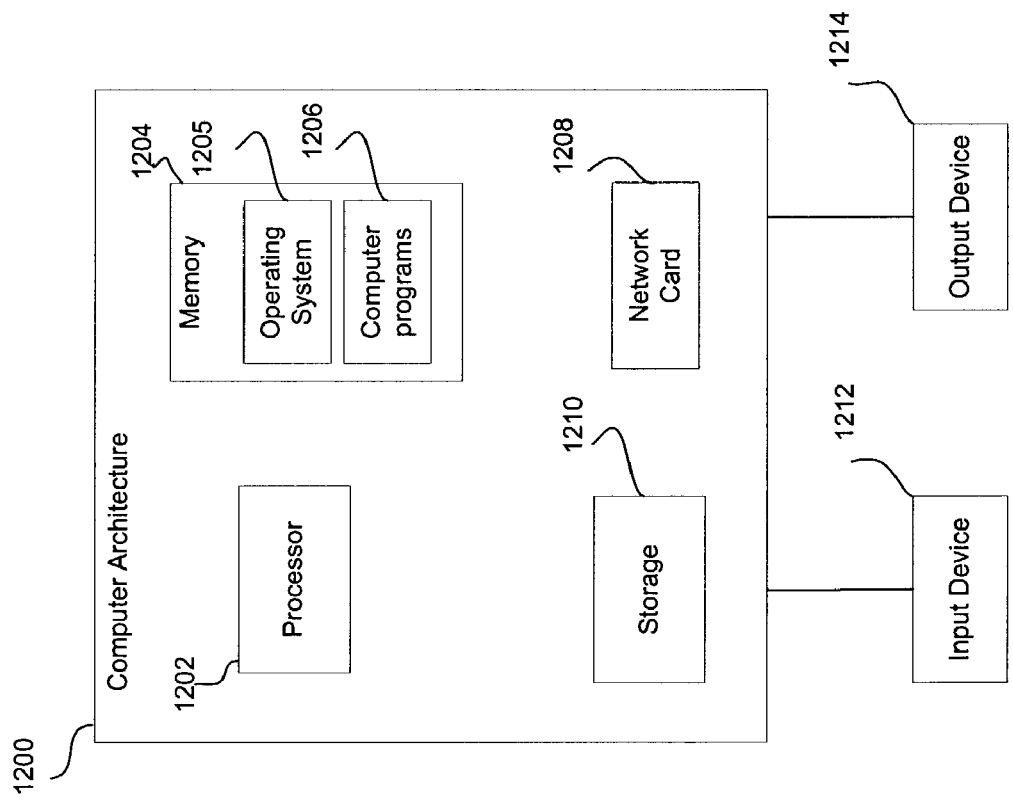
FIG. 12 illustrates an architecture of a computer system that may be used in accordance with certain implementations of the invention.

FIG. 12 illustrates an architecture of a computer system that may be used in accordance with certain implementations of the invention. The computer architecture 1200 has a processor 1202 (e.g., a microprocessor), a memory 1204 (e.g., a volatile memory device), and storage 1210 (e.g., a non-volatile storage area, such as magnetic disk drives, optical disk drives, a tape drive, etc.). An operating system 1205 may execute in memory 1204. The storage 1210 may comprise an internal storage device or an attached or network accessible storage. Computer programs 1206 in storage 1210 may be loaded into the memory 1204 and executed by the processor 1202 in a manner known in the art. The architecture further includes a network card 1208 to enable communication with a network. An input device 1212 is used to provide user input to the processor 1202, and may include a keyboard, mouse, pen-stylus, microphone, touch sensitive display screen, or any other activation or input mechanism known in the art. An output device 1214 is capable of rendering information transmitted from the processor 1202, or other component, such as a display monitor, printer, storage, etc.

The computer architecture 1200 may comprise any computing device known in the art, such as a mainframe, server, personal computer, workstation, laptop, handheld computer, telephony device, network appliance, virtualization device, storage controller, etc. Any processor 1202 and operating system 1205 known in the art may be used.

The foregoing description of implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

Memory Stick is a trademark or registered trademark of Sony Corporation in the United States and/or foreign countries. CompactFlash is a trademark or registered trademark of the CompactFlash Association in the United States and/or foreign countries.

What is claimed is:

1. A system, comprising:

a plurality of power input lines; and a power supply facility configured to provide a combined set of signals including a power signal and an identifier over each of the plurality of power input lines, wherein the power supply facility comprises:

a first uninterruptible power supply and a first power input line, wherein the first power input line is configured to convey a first combined set of signals provided by the first uninterruptible power supply, the first combined set of signals including a first power signal and a first identifier;

a second uninterruptible power supply and a second power input line, wherein the second power input line is configured to convey a second combined set of signals provided by the second uninterruptible power supply, the second combined set of signals including a second power signal and a second identifier; and wherein the system further comprises a redundant system coupled to receive each of the first and second combined sets of signals, the redundant system including control logic configured to determine whether the first uninterruptible power supply is providing power separately and distinctly from the second uninterruptible power supply.

2. The system of claim 1, wherein the first combined set of signals includes a first status signal and the second combined set of signals includes a second status signal, and wherein the power supply facility comprises a first multiplexer configured to multiplex the first power signal and the first status signal, wherein the first status signal includes the first identifier, and wherein the power supply facility further includes a second multiplexer configured to multiplex the second power signal and the second status signal, wherein the second status signal includes the second identifier.

3. The system of claim 2, wherein the redundant system further comprises:

a first demultiplexer, the first demultiplexer coupled to receive the first combined set of signals from the first power supply facility; and a second demultiplexer, the second demultiplexer coupled to receive the second combined set of signals from the second power supply facility.

4. The system of claim 3, wherein the first demultiplexer is configured to demultiplex the first power signal and the first status signal from the first combined set of signals and provide the system with the first power signal over a third power input line and the first status signal over a first data line and wherein the second demultiplexer is configured to demultiplex the second power signal and the second status signal from the second combined set of signals and provide the system with the second power signal over a fourth power input line and the second status signal over a second data line.

5. The system of claim 1, wherein the system represents at least one of a storage system, a data processing system, or a network device.

6. A system, comprising:

a first power input line coupled to a first of at least two uninterruptible power supply facilities;

a second power input line coupled to a second of the at least two uninterruptible power supply facilities;

a first data line;

a second data line;

a first demultiplexer coupled to receive first input signals, which include a first power signal and a first status signal, wherein the first demultiplexer is configured to demultiplex the first power signal and the first status signal;

a second demultiplexer coupled to receive second input signals, which include a second power signal and a second status signal, wherein the second demultiplexer is configured to demultiplex the second power signal and the second status signal; and a computer system coupled to the first demultiplexer via the first power input line and the first data line and coupled to the second demultiplexer via the second power input line and the second data line, wherein the computer system is coupled to receive the first power signal over the first power input line and the first status signal over the first data line, wherein the computer system is coupled to receive the second power signal over the second power input line and the second status signal over the second data line, wherein the first status signal includes a first identifier and the second status signal includes a second identifier, and wherein the computer system is configured to compare the first identifier with the second identifier to determine whether two different of the at least two uninterruptible power supply facilities are being used to power the computer system independently and distinctly from each other.

7. The system of claim 6, wherein the computer system is configured to:

when the first identifier and the second identifier match, determine that two different uninterruptible power supply facilities are not being used to power the system; and when the first identifier and the second identifier do not match, determine that two different uninterruptible power supply facilities are being used to power the system.

8. The system of claim 6, wherein:

the first uninterruptible power supply facility is configured to provide the system with the first status signal; and the second uninterruptible power supply facility is configured to provide the system with a second status signal.

* * * * *